(12) United States Patent
Hiyama et al.

(10) Patent No.: US 10,310,958 B2
(45) Date of Patent: Jun. 4, 2019

(54) RECORDING MEDIUM RECORDING ANALYSIS PROGRAM, ANALYSIS METHOD, AND ANALYSIS APPARATUS

(71) Applicant: FUJITSU LIMITED, Kawasaki-shi, Kanagawa (JP)

(72) Inventors: Daisuke Hiyama, Kashiwa (JP); Sayaka Shimada, Sumida (JP); Hideya Ikeda, Urayasu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/697,650

(22) Filed: Sep. 7, 2017

(65) Prior Publication Data
US 2018/0081779 A1    Mar. 22, 2018

(30) Foreign Application Priority Data

Sep. 16, 2016   (JP) ................................. 2016-182007

(51) Int. Cl.
*H04N 1/00*     (2006.01)
*G06F 11/34*     (2006.01)
(Continued)

(52) U.S. Cl.
CPC ...... *G06F 11/3476* (2013.01); *G06F 11/3495* (2013.01); *G06F 11/3664* (2013.01); *G06F 16/33* (2019.01); *H04N 1/00408* (2013.01)

(58) Field of Classification Search
CPC ......... G06F 17/30289; G06F 17/30306; G06F 11/3668; G06F 11/3672; G06F 11/3676; G06F 11/3688; G06F 11/3692
See application file for complete search history.

(56) References Cited

U.S. PATENT DOCUMENTS 5,724,556 A * 3/1998 Souder .................. G06F 8/20
                                                          715/835
6,145,121 A * 11/2000 Levy .................. G06F 11/3461
                                                          717/135

(Continued)

FOREIGN PATENT DOCUMENTS

JP     2007-213392 A     8/2007
JP     2008-77285 A     4/2008

OTHER PUBLICATIONS

Nathaniel Duca et al.; A Relational Debugging Engine for the Graphics Pipeline; ACM; pp. 453-463; <https://dl.acm.org/citation.cfm?id=1073213>; retrieved on Feb. 21, 2019 (Year: 2005).*

(Continued)

*Primary Examiner* — Geoffrey R St Leger
*Assistant Examiner* — Cuong V Luu
(74) *Attorney, Agent, or Firm* — Westerman, Hattori, Daniels & Adrian, LLP (57) ABSTRACT

A non-transitory computer-readable recording medium recording an analysis program for causing a computer to execute a process includes: generating a program by embedding a command for storing a process log in a storage into a compiled program generated by compiling a source program including a display command instructing to display a object; specifying an operation command related to a database in association with identification information of the object based on the process log stored in the storage by the display command in execution of the program; analyzing the operation command to specify an access destination; and outputting, for every access destination, a correspondence including information indicating a type of the operation command in association with the identification information of the predetermined object.

9 Claims, 10 Drawing Sheets

(51) Int. Cl.
*G06F 11/36* (2006.01)
*G06F 16/33* (2019.01)

(56) References Cited

U.S. PATENT DOCUMENTS

| | | | | |
|---|---|---|---|---|
| 8,108,350 | B2* | 1/2012 | Rohwedder | G06F 17/30306 |
| | | | | 707/648 |
| 9,916,140 | B2* | 3/2018 | Li | G06F 17/3089 |
| 2005/0049999 | A1* | 3/2005 | Birn | G06F 11/3636 |
| | | | | 714/E11.207 |
| 2005/0262060 | A1* | 11/2005 | Rohwedder | G06F 17/30306 |
| 2009/0249308 | A1* | 10/2009 | Li | G06F 11/3676 |
| | | | | 717/132 |
| 2009/0287729 | A1* | 11/2009 | Chen | G06F 11/3676 |
| | | | | 717/127 |
| 2010/0094805 | A1* | 4/2010 | Ingerman | G06F 8/35 |
| | | | | 717/106 |
| 2010/0281305 | A1* | 11/2010 | Sasaki | G06F 16/2462 |
| | | | | 714/38.1 |

OTHER PUBLICATIONS

Chuck Cranor et al.; Gigascope High Performance Network Monitoring with an SQL Interface; SIGMOD; one page; <https://dl.acm.org/citation.cfm?id=564777>; retrieved on Feb. 21, 2019 (Year: 2002).*

Yuji Kosuga et al.; Sania Syntactic and Semantic Analysis for Automated Testing against SQL Injection; IEEE; pp. 107-116; <https://ieeexplore.ieee.org/stamps.jsp?tp=&arnumber=4412981>, retrieved on Feb. 21, 2019 (Year: 2007).*

* cited by examiner

| No. | PROCESS START DATE | SYSTEM ID | FUNCTION ID | FUNCTION NAME | SCREEN ID | SCREEN NAME | BUTTON ID | BUTTON NAME | CLASS | METHOD | PROCESS TIME |
|---|---|---|---|---|---|---|---|---|---|---|---|
| 3 | 2016/6/9 10:17:03 | Product Sample V15 | com.fujitsu. intarfrm.produc tsample.progra ms.prdmaster.p rdmasterview | com.fujitsu. intarfrm.produc tsample.progra ms.prdmaster.p rdmasterview | Predmaste rviewCon troller | Predmaste rviewCon troller | process Body | process Body | com.fujitsu.inta rfrm.helpers.m odels.transactio ns.IfmPrepared Statement | execute Query | 33 |
| 4 | 2016/6/9 10:17:03 | Product Sample V15 | com.fujitsu. intarfrm.produc tsample.progra ms.prdmaster.p rdmasterview | com.fujitsu. intarfrm.produc tsample.progra ms.prdmaster.p rdmasterview | Predmaste rviewCon troller | Predmaste rviewCon troller | process Body | process Body | com.fujitsu.inta rfrm.helpers.m odels.transactio ns.IfmPrepared Statement | execute Query | 8 |
| 5 | 2016/6/9 10:17:16 | Product Sample V15 | com.fujitsu. intarfrm.produc tsample.progra ms.prdmaster.p rdmasterview | com.fujitsu. intarfrm.produc tsample.progra ms.prdmaster.p rdmasterview | Predmaste rviewCon troller | Predmaste rviewCon troller | process Body | process Body | com.fujitsu.inta rfrm.helpers.m odels.transactio ns.IfmPrepared Statement | -Load | 20 |
| 10 | 2016/6/9 10:17:58 | Product Sample V15 | com.fujitsu. intarfrm.produc tsample.progra ms.prdmaster.p rdmasterview | com.fujitsu. intarfrm.produc tsample.progra ms.prdmaster.p rdmasterview | Predmaste rviewCon troller | Predmaste rviewCon troller | process Body | process Body | oracle.jdbc. driver.Oracl Prepared Statemen Wrapper | execute Query | 10 |
| 14 | 2016/6/9 10:18:31 | Product Sample V15 | com.fujitsu. intarfrm.produc tsample.progra ms.prdmaster.p rdmasterview | com.fujitsu. intarfrm.produc tsample.progra ms.prdmaster.p rdmasterview | Predmaste rviewCon troller | Predmaste rviewCon troller | process Body | process Body | oracle.jdbc. driver.Oracl Prepared Statemen Wrapper | process Body | 10 |

FIG. 5

| EXCEPTION | PARAMETER | ARGUMENT | RESULT | EXCEPTION DETAIL |
|---|---|---|---|---|
|  | {argTable={bindParam-1="%A%", sql="SELECT PRODUCTID, PRODUCTNAME, PRICE, VENDOR FROM M_PRODUCT WHERE PRODUCTNAME LIKE ?"}, result="", exception=null, MONITORING_OMITTED_COUNT=null, deltaMemory=0, totalTime=761160, totalTime=33} | {bindParam-1="%A%", sql="SELECT PRODUCTID, PRODUCTNAME, PRICE, VENDOR FROM M_PRODUCT WHERE PRODUCTNAME LIKE ?"} | ... |  |
|  | {argTable={bindParam-1="%A%", sql="SELECT PRODUCTID, PRODUCTNAME, PRICE, VENDOR FROM M_PRODUCT WHERE PRODUCTNAME LIKE ?"}, result="", exception=null, MONITORING_OMITTED_COUNT=null, deltaMemory=0, totalTime=8} | {bindParam-1="%A%", sql="SELECT PRODUCTID, PRODUCTNAME, PRICE, VENDOR FROM M_PRODUCT WHERE PRODUCTNAME LIKE ?"} | ... |  |
|  | {argTable={bindParam-1=null, sql="SELECT PRODUCTID, PRODUCTNAME, PRICE, VENDOR FROM M_PRODUCT WHERE PRODUCTID = ?"}, result="", exception=null, MONITORING_OMITTED_COUNT=null, deltaMemory=0, totalTime=20} | {bindParam-1=null, sql="SELECT PRODUCTID, PRODUCTNAME, PRICE, VENDOR FROM M_PRODUCT WHERE PRODUCTID = ?"} | ... |  |
|  |  | {bindParam-1="Z001", sql="SELECT PRODUCTID, PRODUCTNAME, PRICE, VENDOR FROM M_PRODUCT WHERE PRODUCTID = ?"} | ... |  |
|  | {argTable={bindParam-1="Z001", sql="SELECT PRODUCTID, PRODUCTNAME, PRICE, VENDOR FROM M_PRODUCT WHERE PRODUCTID =?"}, result="", exception=null, MONITORING_OMITTED_COUNT=null, deltaMemory=0, totalTime=10} | {bindParam-1="Z001", sql="SELECT PRODUCTID, PRODUCTNAME, PRICE, VENDOR FROM M_PRODUCT WHERE PRODUCTID = ?"} | ... |  |

|  | | ACCESS DESTINATION | | | |
|---|---|---|---|---|---|
| ACCESS SOURCE | SCREEN NAME \ TABLE NAME | TABLE_1 | TABLE_2 | TABLE_3 | TABLE_4 |
| | SCREEN_1 | R | R | R | R |
| | SCREEN_2 | | CR | | |
| | SCREEN_3 | | | | |
| | SCREEN_4 | CRUD | | | |

FIG. 8B

|  | | ACCESS DESTINATION | | | |
|---|---|---|---|---|---|
| ACCESS SOURCE | BUTTON NAME \ TABLE NAME | TABLE_1 | TABLE_2 | TABLE_3 | TABLE_4 |
| | BUTTON_1 | | | R | |
| | BUTTON_2 | | | CRUD | |
| | BUTTON_3 | | D | | R |
| | BUTTON_4 | U | | | C |

FIG. 9

RECORDING MEDIUM RECORDING ANALYSIS PROGRAM, ANALYSIS METHOD, AND ANALYSIS APPARATUS

CROSS-REFERENCE TO RELATED APPLICATION

This application is based upon and claims the benefit of priority of the prior Japanese Patent Application No. 2016-182007, filed on Sep. 16, 2016, the entire contents of which are incorporated herein by reference.

FIELD

The embodiments discussed herein are related to a recording medium storing an analysis program, an analysis method, and an analysis apparatus.

BACKGROUND

An application program is analyzed using a code for acquiring a structured query language (SQL) trace.

Related technologies are disclosed in, for example, Japanese Laid-Open Patent Publication No. 2007-213392 and Japanese Laid-Open Patent Publication No. 2008-077285.

SUMMARY

According to one aspect of the embodiments, a non-transitory computer-readable recording medium recording an analysis program for causing a computer to execute a process includes: generating a program by embedding a command for storing a process log in a storage into a compiled program generated by compiling a source program including a display command instructing to display a object; specifying an operation command related to a database in association with identification information of the object based on the process log stored in the storage by the display command in execution of the program; analyzing the operation command to specify an access destination; and outputting, for every access destination, a correspondence including information indicating a type of the operation command in association with the identification information of the predetermined object.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a table illustrating an example of a part of monitoring data;

DESCRIPTION OF EMBODIMENTS

For example, the code for acquiring a structured query language (SQL) trace is embedded in an application program (hereinafter simply referred to as an "application"). For example, an SQL statement is analyzed, and the type of data operation in the SQL statement such as an update or a deletion is read out. For example, a correspondence table showing the type of data operation executed on the table using a log at the time of SQL issuance is output for each class or method that has issued an SQL.

For example, in a case where each development team shares a development work of the application on a screen unit basis or on a button basis, it may not be easy to specify which development team should be in charge even though the correspondence table described above is output.

For example, an analysis program, an analysis method, and an analysis apparatus capable of outputting a correspondence table showing the type of data operation performed on an access destination for each screen or for each button may be provided.

Figure 1:
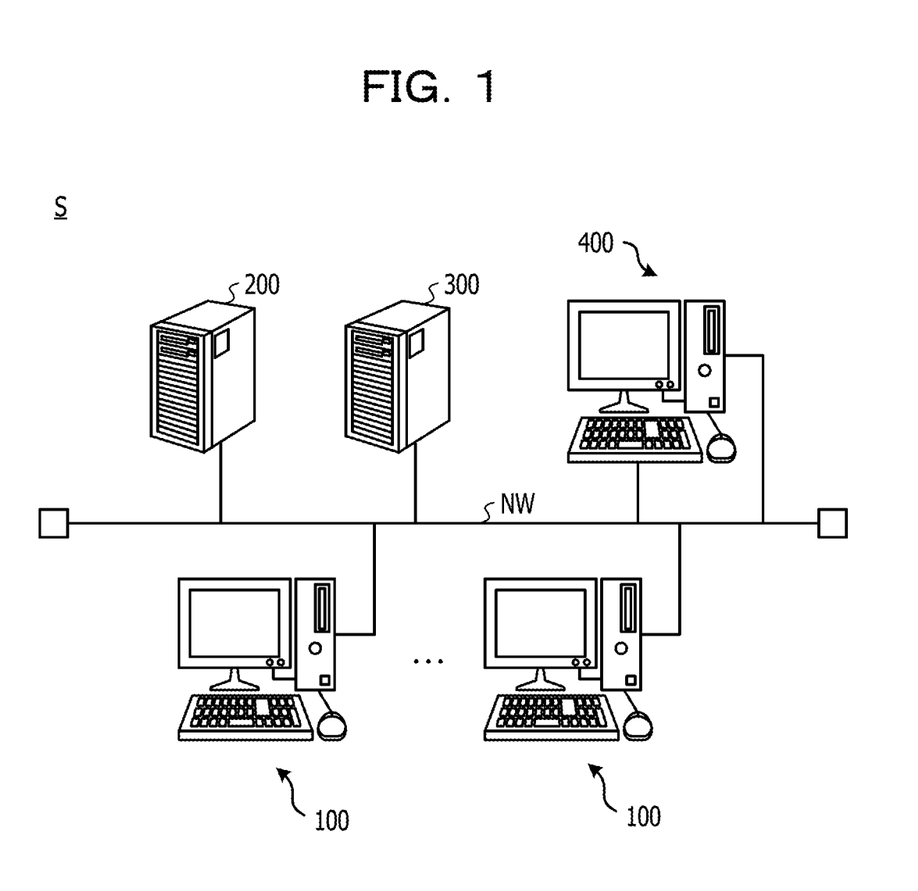
FIG. 1 is a view illustrating an example of an analysis system.

FIG. 1 illustrates an example of an analysis system S. The analysis system S includes a plurality of first terminals 100, a first server 200, and, as an analysis device, a second server 300 and a second terminal 400. In FIG. 1, a personal computer (PC) is illustrated as an example of the first terminals 100 and the second terminal 400, but it may be a smart device such as a tablet terminal. Although a plurality of first terminals 100 is illustrated in FIG. 1, the number of first terminals 100 may be one. A portion of the plurality of first terminals 100 may be arranged in buildings which are different from each other (e.g., buildings at remote places).

The first terminals 100, the first server 200, the second server 300, and the second terminal 400 are coupled to each other via a communication network NW. The communication network NW may be, for example, a wired network such as the Internet or a local area network (LAN). A wireless network utilizing radio waves may be used in a part of the communication network NW.

The first server 200 stores applications such as, for example, business applications developed by developers. Each application includes a command for screen display, a command for button display, and the like. The first terminal 100 is used by a test executor who tests an application stored in the first server 200. The first terminal 100 transmits an execution instruction of the application to the first server 200 based on the operation from the test executor. Accordingly, the application is executed on the first server 200.

The first server 200 stores monitoring software (hereinafter may be referred to as a "monitoring soft") that monitors the behavior of the application. The first server 200 attaches the monitoring soft to the monitoring target application in an add-on format. The first server 200 may attach the monitoring soft at the time of compiling the application, and may attach the monitoring soft at the time of loading the class into a virtual machine such as, for example, Java (registered trademark) VM. For example, when the first server 200 compiles the application, the first server 200 embeds a command that outputs a log indicating the behavior of the application, in a first intermediate code such as, for example, a bytecode generated by compiling. For example, the first server 200 generates a second intermediate code in which the command is embedded. The log indicating the behavior of the application may include, for example, a log of the SQL issued by executing the application or a log specifying the screen name or the button name as the issuer that has issued the SQL. Therefore, when the first server 200 executes the second intermediate code, a log indicating the behavior of the application is output from the second intermediate code. The monitoring soft transmits the log output by the application to the second server 300 as monitoring data. The second server 300 stores the monitoring data transmitted from the first server 200.

The second server 300 generates and stores a CRUD diagram using the monitoring data. The CRUD diagram is a table expressing on which screen or by which button the data is created, referred or read, updated, or deleted in a matrix format. Finally, the second terminal 400 may be used by a person in charge who confirms the CRUD diagram to determine the test result. The second terminal 400 acquires (e.g., downloads) the CRUD diagram from the second server 300 based on the operation from the person in charge. Therefore, the person in charge who uses the second terminal 400 may confirm the CRUD diagram.

Figure 2:
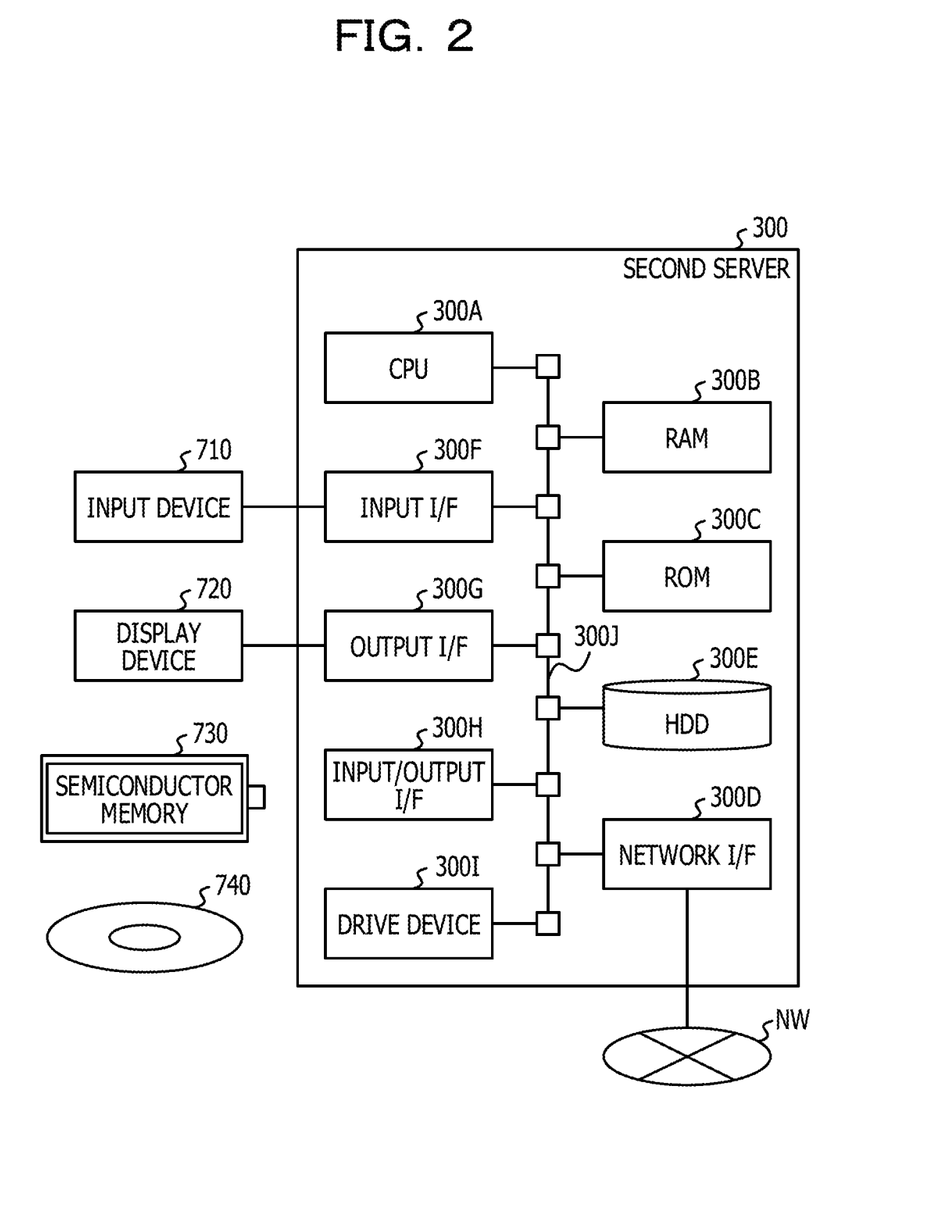
FIG. 2 is a block diagram illustrating an example of a hardware configuration of a second server.

FIG. 2 illustrates an example of a hardware configuration of the second server. The configurations of the first terminal 100, the first server 200, and the second terminal 400 may be substantially the same as or similar to the configuration of the second server 300, and descriptions thereof may be omitted.

The second server 300 includes at least a central processing unit (CPU) 300A, a random access memory (RAM) 300B, a read only memory (ROM) 300C, and a network I/F (interface) 300D. The second server 300 may include at least one of a hard disk drive (HDD) 300E, an input I/F 300F, an output I/F 300G, an input/output I/F 300H, and a drive device 3001, as necessary. The CPU 300A to the drive device 3001 are coupled to each other by an internal bus 300J. The function of the computer is implemented at least by the cooperation of the CPU 300A and the RAM 300B.

The input I/F 300F is coupled with an input device 710. The input device 710 may include, for example, a keyboard or a mouse.

The output I/F 300G is coupled with a display device 720. The display device 720 used herein may be, for example, a liquid crystal display.

The input/output I/F 300H is coupled with a semiconductor memory 730. The semiconductor memory 730 used herein may be, for example, a universal serial bus (USB) memory, a flash memory or the like. The input/output I/F 300H reads a program or data stored in the semiconductor memory 730. The input I/F 300F and the input/output I/F 300H may be provided with, for example, a USB port. The output I/F 300G may be provided with, for example, a display port.

A portable recording medium 740 is inserted into the drive device 3001. The portable recording medium 740 includes, for example, a removable disk such as a compact disc (CD)-ROM and a digital versatile disc (DVD). The drive device 3001 reads a program or data recorded on the portable recording medium 740. The network I/F 300D includes, for example, a port and a physical layer chip (PHY chip). The second server 300 is coupled to the communication network NW via the network I/F 300D.

In the RAM 300B, the program stored in the ROM 300C or the HDD 300E is stored by the CPU 300A. In the RAM 300B, the program recorded on the portable recording medium 740 is stored by the CPU 300A. As the stored program is executed by the CPU 300A, the second server 300 implements various functions or executes various processes.

Figure 3:
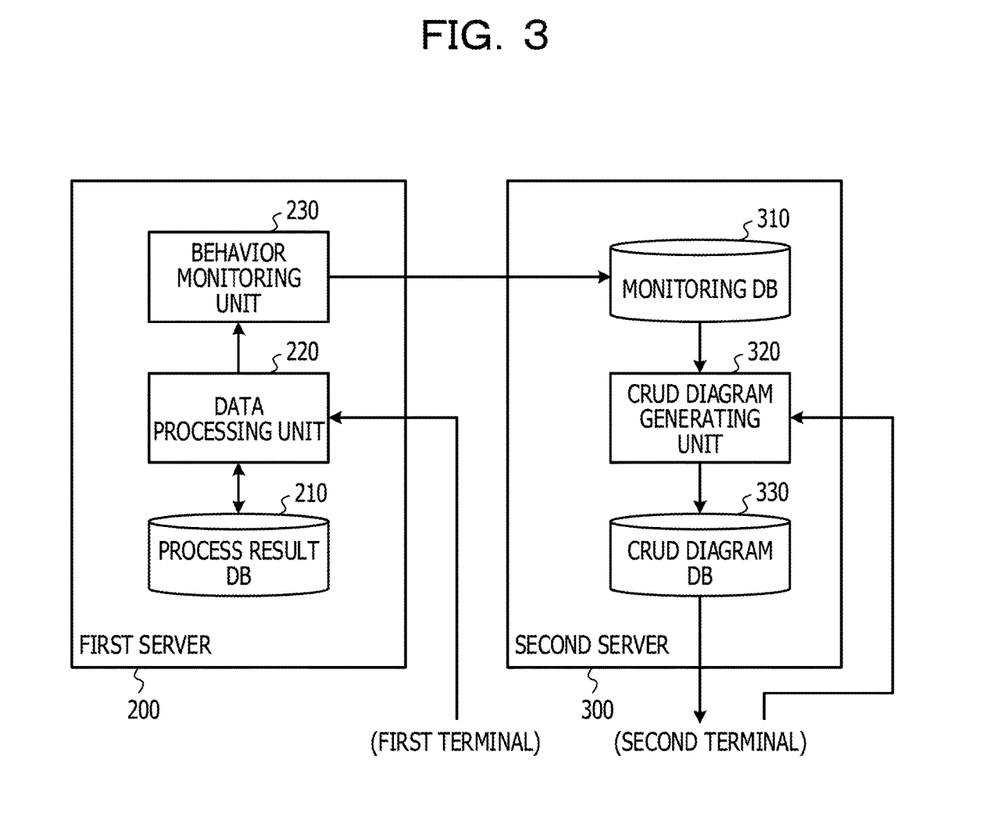
FIG. 3 is a block diagram illustrating an example of a functional diagram of a first server and the second server.
Figure 5:
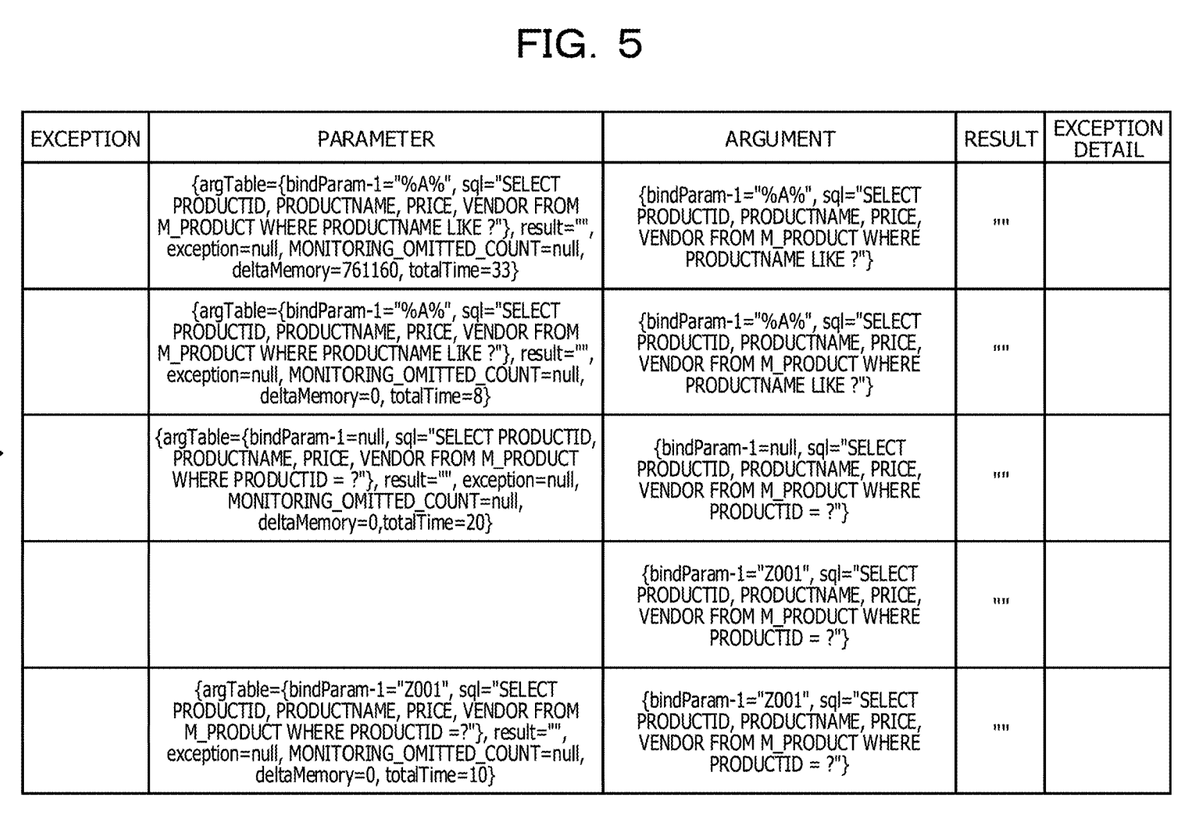
FIG. 5 is a table illustrating an example of the rest of the monitoring data.

FIG. 3 illustrates an example of a functional diagram of the first server and the second server. FIG. 4 illustrates an example of a part of the monitoring data. FIG. 5 illustrates an example of the rest of the monitoring data. As illustrated in FIG. 3, the first server 200 includes a process result DB 210, a data processing unit 220, and a behavior monitoring unit 230. The second server 300 includes a monitoring DB 310, a CRUD diagram generating unit 320 as a processing unit, and a CRUD diagram DB 330. For example, as illustrated in FIGS. 4 and 5, the monitoring data are related to each other and are continuous.

The process result DB 210 stores various tables storing business data. For example, the process result DB 210 stores a customer table in which customer attribute data is stored. For example, a product table storing sales data of products may be stored. The business data may be data for testing, or may be actually operated data.

The data processing unit 220 executes various data processes according to the execution of the application described above, and stores the process result of the data process in the process result DB 210. For example, in an application that registers or changes customer attribute data, the data processing unit 220 accesses the customer table stored in the process result DB 210, registers the input customer data in the customer table, or changes the customer data stored in the customer table. For example, in an application that calculates sales of products, the data processing unit 220 accesses the product table stored in the process result DB 210, and acquires data representing the unit prices of the products and data indicating the number of products sold. The data processing unit 220 calculates sales based on the acquired data and registers data representing the calculated sales in the product table.

The behavior monitoring unit 230 monitors the data process executed by the data processing unit 220 as the behavior of the application by executing the monitoring software described above. When the data processing unit 220 executes the data process, the behavior monitoring unit 230 collects logs related to the data process and stores the collected logs in the monitoring DB 310 as monitoring data. Therefore, the monitoring DB 310 stores the monitoring data related to the data process executed by the data processing unit 220.

For example, as illustrated in FIGS. 4 and 5, the monitoring data may include various data as constituent elements. For example, as illustrated in FIG. 4, the monitoring data includes screen ID data and screen name data as information for identifying the display screen. The display screen is identified by the screen ID and screen name. For example, as illustrated in FIG. 4, the monitoring data includes button ID data and button name data as information for identifying the display button. The display button is identified by the button ID and button name.

For example, as illustrated in FIG. 5, the monitoring data may include parameter data. The parameter indicates a log of the SQL issued when the data processing unit 220 executes the data process. For example, "SELECT," which is a part of the log, may be a command representing reference or read. For example, when "INSERT" appears in a part of the log, "INSERT" may be a command representing creation. For example, "UPDATE" and "DELETE" may correspond to commands representing update and deletion, respectively. In the log, the table name appears as the access destination. For example, "M_PRODUCT" appearing in a part of the log represents a table name. In this way, the access source such as the screen ID, the screen name, the button ID and the button name, and the parameters (for example, an SQL as the operation command) are associated with each other by the monitoring data. The SQL log includes the table name accessed from the access source. Therefore, the screen ID, the screen name, the button ID, the button name, and table name are associated with each other.

The CRUD diagram generating unit 320 generates and outputs a CRUD diagram using the monitoring data stored in the monitoring DB 310. For example, the CRUD diagram generating unit 320 generates and outputs a CRUD diagram indicating information such as the type of the specified SQL for each specified access destination in association with the screen ID and the screen name. The CRUD diagram generating unit 320 generates and outputs a CRUD diagram indicating information such as the type of the operation of the specified SQL for each specified access destination in association with the button ID and the button name. The information indicating the type of the SQL includes, for example, an initial letter C of "Create" representing creation, an initial letter R of "Read" representing reference or read, an initial letter U of "Update" representing update, and an initial letter D of "Delete" indicating deletion, or a combination of at least two of these initial letters. The CRUD diagram output by the CRUD diagram generating unit 320 is stored in the CRUD diagram DB 330. Therefore, the CRUD diagram DB 330 stores the CRUD diagram. The second terminal 400 may download the CRUD diagram by accessing the CRUD diagram DB 330.

Figure 6:
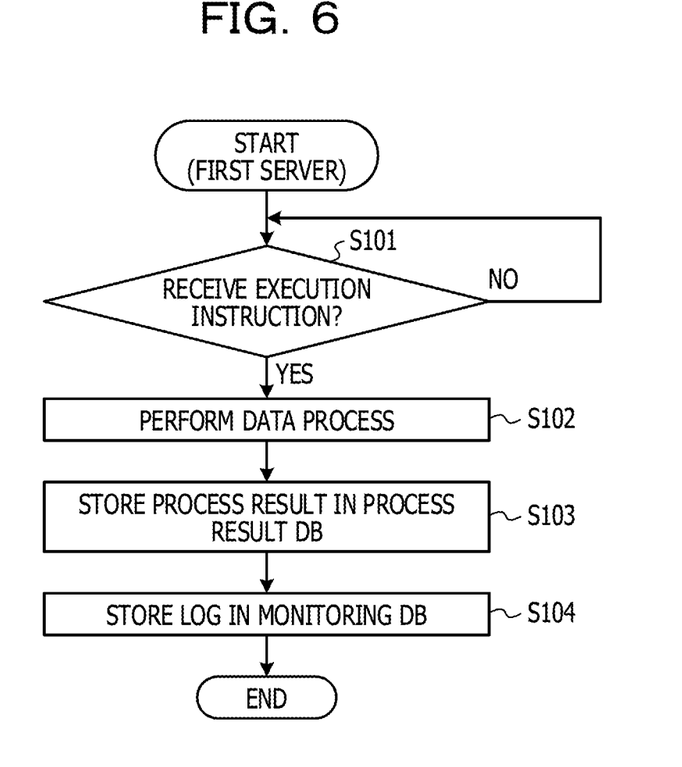
FIG. 6 is a flowchart illustrating an exemplary operation of the first server.

FIG. 6 illustrates an example of an operation of the first server. The data processing unit 220 waits until receiving an application execution instruction from the first terminal 100 (Operation S101: NO). Upon receiving the execution instruction (Operation S101: YES), the data processing unit 220 executes various data processes according to the execution of the application (operation S102). When the process of operation S102 is started, the data processing unit 220 stores the process result in the process result DB 210 (operation S103), and the behavior monitoring unit 230 stores the log in the monitoring DB 310 (operation S104). The order of operation S103 and operation S104 may be reversed or may be executed in parallel.

Figure 7:
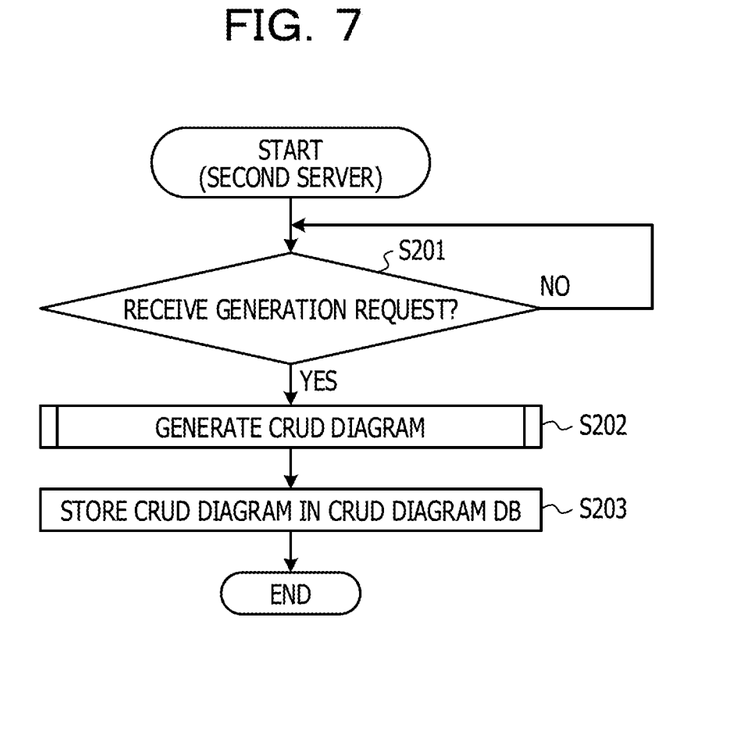
FIG. 7 is a flowchart illustrating an exemplary operation of the second server.

FIG. 7 illustrates an example of an operation of the second server. The CRUD diagram generating unit 320 waits until receiving a CRUD diagram generation request from the second terminal 400 (operation S201: NO). Upon receiving the generation request (operation S201: YES), the CRUD diagram generating unit 320 executes the CRUD diagram generating process (operation S202). The CRUD diagram generating process is a process for generating a CRUD diagram. When operation S202 is completed, the CRUD diagram generating unit 320 stores the CRUD diagram generated in operation S202 in the CRUD diagram DB 330 (operation S203). The CRUD diagram generating unit 320 may execute the CRUD diagram generating process by a batch process starting at night according to the set time instead of receiving the generation request.

Figure 8A:
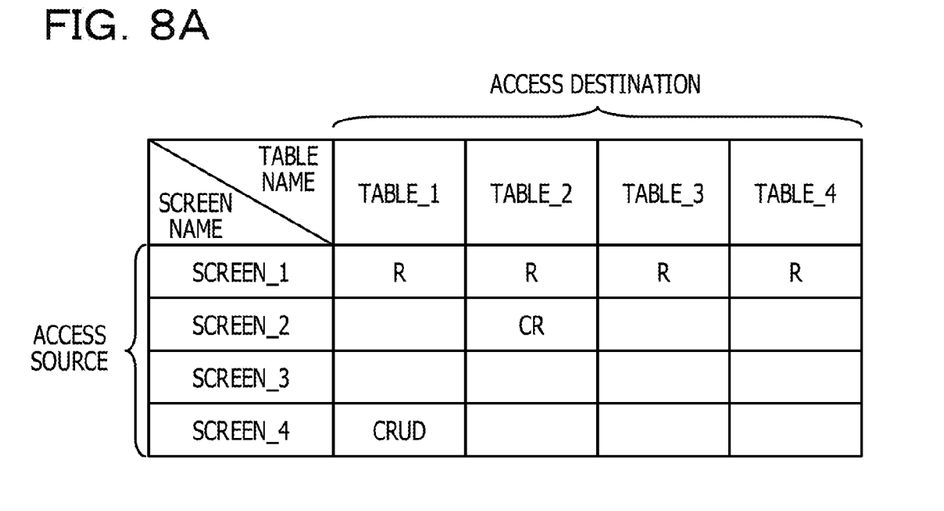
FIGS. 8A and 8B each illustrate an example of a structured query language (CRUD) diagram.
Figure 8B:
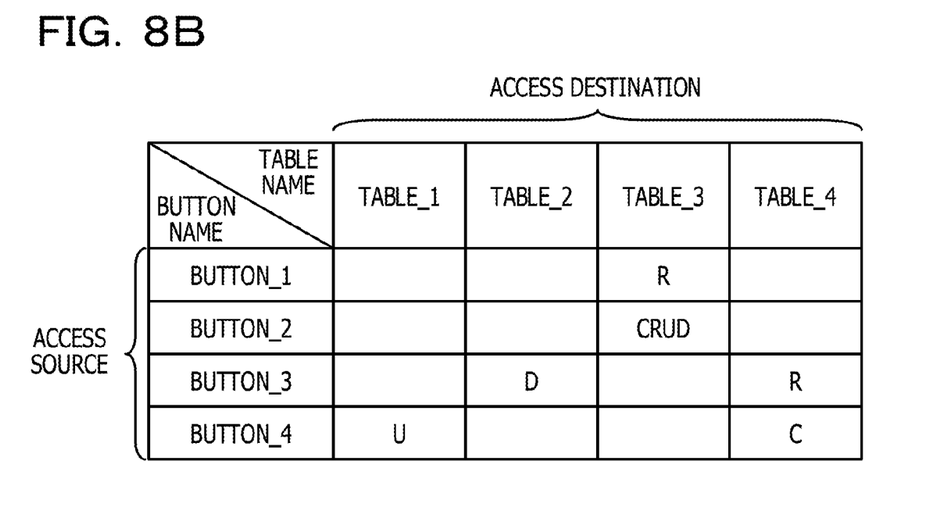

FIGS. 8A and 8B illustrate an example of a CRUD diagram. For example, when the CRUD diagram generating unit 320 receives a generation request for generating a CRUD diagram for each screen name, the CRUD diagram DB 330 stores a CRUD diagram representing C, R, U, and D for each specified table name in association with the screen name, as illustrated in FIG. 8A. In the case of a generation request related to the screen ID, the CRUD diagram DB 330 stores a CRUD diagram in association with the screen ID. For example, when the CRUD diagram generating unit 320 receives a generation request for generating a CRUD diagram for each button name, the CRUD diagram DB 330 stores a CRUD diagram representing C, R, U, or D for each specified table name in association with the button name, as illustrated in FIG. 8B. In the case of a generation request related to the button ID, the CRUD diagram DB 330 stores a CRUD diagram in association with the button ID. Thus, since the CRUD diagram DB 330 stores the CRUD diagram for each screen ID and screen name, and the CRUD diagram for each button ID and button name, these CRUD diagrams may be acquired when the second terminal 400 accesses the CRUD diagram DB 330.

Figure 9:
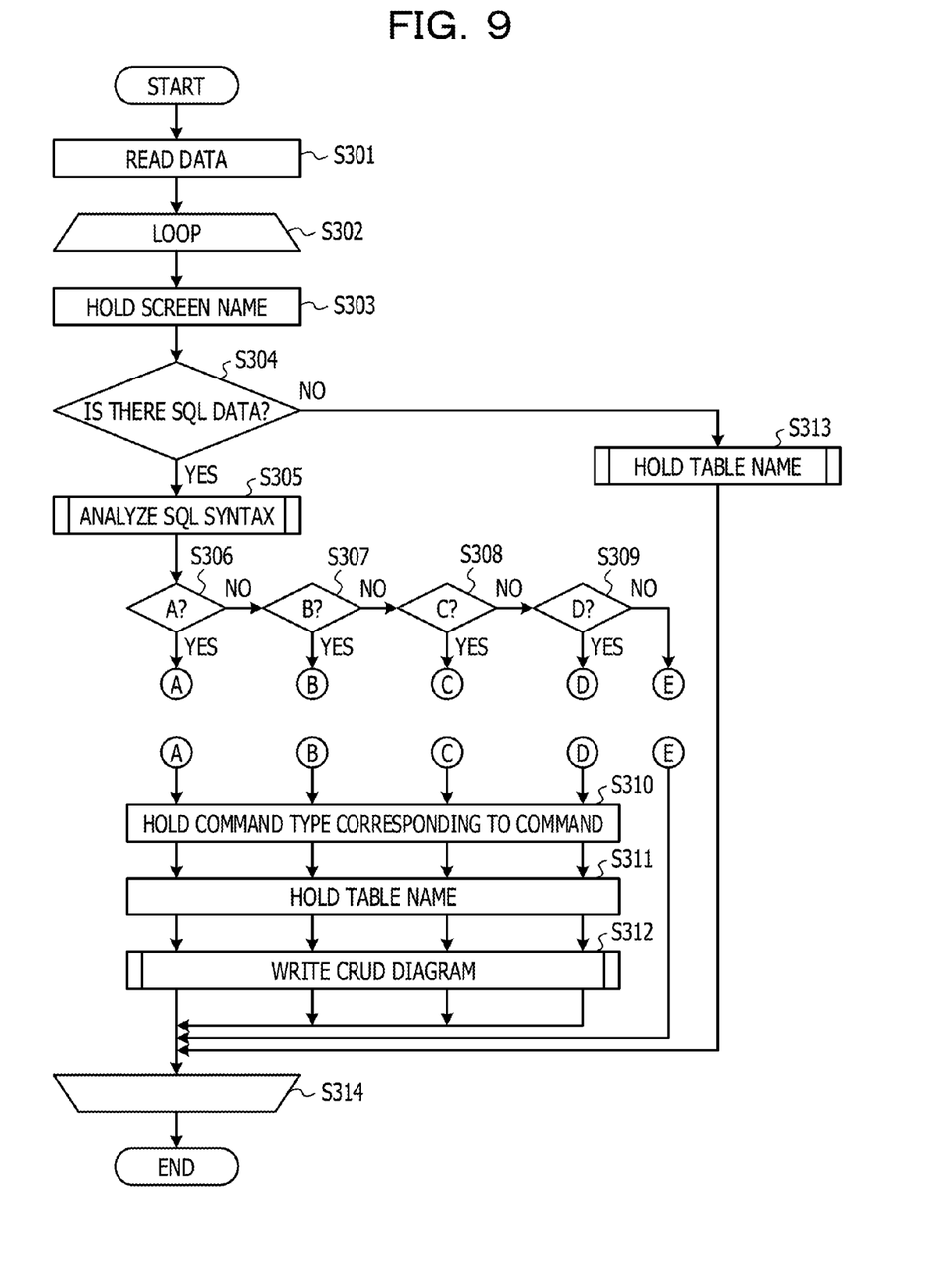
FIG. 9 is a flowchart illustrating an example of a CRUD diagram generating process.

In FIG. 9, the CRUD diagram generating process related to the screen name is described as an example, but the CRUD diagram generating processes related to the screen ID, button name, and button ID are also similar to that related to the screen name. Thus, descriptions thereof may be omitted.

FIG. 9 illustrates an example of a CRUD diagram generating process. For example, the CRUD diagram generating unit 320 reads monitoring data from the monitoring DB 310 (operation S301). When operation S301 is completed, the CRUD diagram generating unit 320 starts a loop process with respect to subsequent processes up to the end of the read monitoring data (operation S302). For example, the CRUD diagram generating unit 320 holds the screen name of the read monitoring data (operation S303). The CRUD diagram generating unit 320 confirms the parameters in the monitoring data and determines whether there is SQL data (operation S304).

When it is determined that there is SQL data (operation S304: YES), the CRUD diagram generating unit 320 identifies the SQL data and executes an SQL syntax analyzing process (operation S305). For example, the CRUD diagram generating unit 320 acquires and specifies the command and the table name as the target of the command from the SQL syntax represented by the SQL data. For example, the command may include, for example, JOIN, COUNT, and the like in addition to SELECT, INSERT, UPDATE, and DELETE. When operation S305 is completed, the CRUD diagram generating unit 320 determines the type of the acquired command (operations S306 to S309). In FIG. 9, SELECT, INSERT, UPDATE, and DELETE are denoted as A, B, C, D in order, respectively, and those except for SELECT, INSERT, UPDATE, and DELETE are expressed as E.

For example, when the CRUD diagram generating unit 320 acquires SELECT as a command (S306: YES), the command type "1" corresponding to the command is held (operation S310). When the CRUD diagram generating unit 320 does not acquire SELECT as a command (operation S306: NO) and acquires INSERT as a command (operation S307: YES), the command type "2" corresponding to the command is held (operation S310). Similarly, when the CRUD diagram generating unit 320 does not acquire INSERT as a command (operation S307: NO) and acquires UPDATE as a command (operation S308: YES), the command type "3" corresponding to the command is held (operation S310). When the CRUD diagram generating unit 320 does not acquire UPDATE as a command (operation S308: NO) and acquires DELETE as a command (operation S309: YES), the command type "4" corresponding to the command is held (operation S310). When the CRUD diagram generating unit 320 does not acquire DELETE as a command (operation S309: NO), the subsequent operations S310 to S312 are skipped.

When the process of operation S310 is completed, the CRUD diagram generating unit 320 holds the table name acquired in operation S305 (operation S311). When operation S311 is completed, the CRUD diagram generating unit 320 executes a CRUD diagram writing process using the screen name held in operation S303, the command type held in the process of operation S310, and the table name held in the process of operation S311 as arguments (operation S312).

In operation S304, when the CRUD diagram generating unit 320 determines that there is no SQL data (operation S304: NO), the CRUD diagram generating unit 320 executes a CRUD diagram writing process using the screen name held in operation S303, the predetermined command type "5", and the table name "NULL" as arguments (operation S313). For example, as illustrated in FIG. 5, there may be no SQL data depending on the parameters.

When operations S312 and S313 are completed, the CRUD diagram generating unit 320 shifts to the next monitoring data (operation S314). As a result, the processes from operation S303 to operation S312 or the processes of operations S303, S304, and S313 are executed on the next monitoring data. When the processes from operation S303 to operation S312 or the processes of operations S303, S304, and S313 are completed up to the end of the monitoring data, the CRUD diagram generating unit 320 finishes the CRUD diagram generating process and stores the generated CRUD diagram in the CRUD diagram DB 330.

Figure 10:
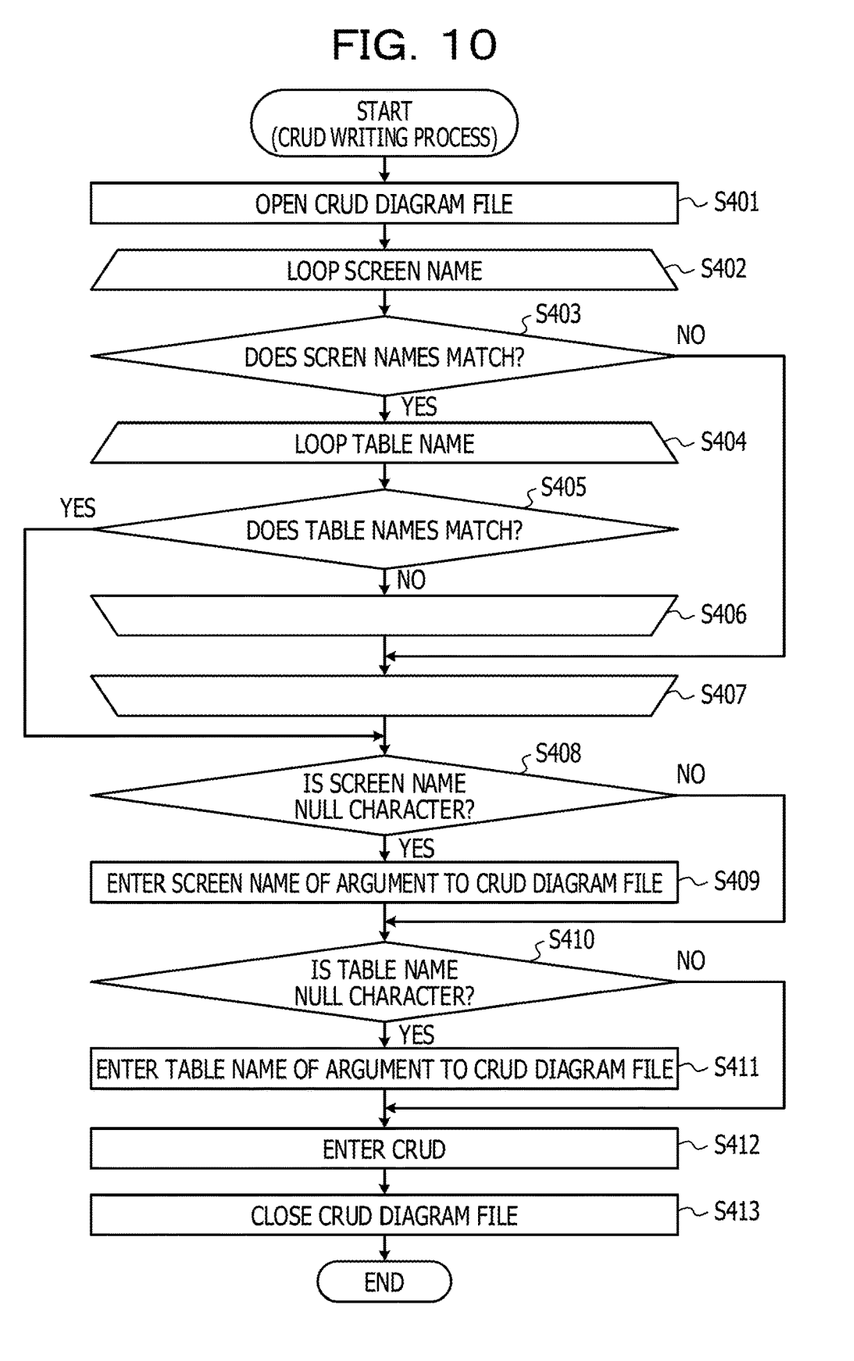
FIG. 10 is a flowchart illustrating an example of a CRUD diagram writing process.

FIG. 10 illustrates an example of a CRUD diagram writing process. The CRUD diagram generating unit 320 opens the CRUD diagram file (operation S401). The CRUD diagram file may be an electronic file of a predetermined table format. When the CRUD diagram writing process is executed for the first time, nothing is entered in the CRUD diagram file. For example, in the CRUD diagram file, the screen name, the initial letter of the command corresponding to the command type, and the table name as the arguments described above are not entered. When the CRUD diagram process is executed for the second time or later, the screen name, the initial letter of the command corresponding to the command kind, or the table name as the argument described above may be entered in the CRUD diagram file.

When operation S401 is completed, the CRUD diagram generating unit 320 starts the subsequent loop process until the screen name of the CRUD diagram file becomes null (operation S402). The CRUD diagram generating unit 320 determines whether or not the screen name of the CRUD diagram file matches the screen name of the argument (operation S403). When it is determined that the screen names match (operation S403: YES), the CRUD diagram generating unit 320 starts the subsequent loop process until the table name of the CRUD diagram file becomes null (operation S404).

The CRUD diagram generating unit 320 determines whether or not the table name of the CRUD diagram file matches the table name of the argument (operation S405). When it is determined that the table names do not match (operation S405: NO), the CRUD diagram generating unit 320 shifts to the next table name (operation S406). For example, the CRUD diagram generating unit 320 repeats operation S405 until the table names match or the table name becomes null. In the process of operation S403 described above, when it is determined that the screen names do not match (operation S403: NO), the CRUD diagram generating unit 320 shifts to the next screen name (operation S407). For example, the CRUD diagram generating unit 320 repeats the process from operation S404 to operation S406 until the screen names match or the screen name becomes null.

When operations S402 to S407 are completed, the CRUD diagram generating unit 320 determines whether or not the screen name of the CRUD diagram file is a null character (operation S408). When it is determined that the screen name is a null character (operation S408: YES), the CRUD diagram generating unit 320 enters the screen name of the argument in the CRUD diagram file (operation S409). When it is determined that the screen name is not a null character (operation S408: NO), the CRUD diagram generating unit 320 skips operation S409. For example, the already entered screen name is the subsequent process target.

When operation S408 or operation S409 is completed, the CRUD diagram generating unit 320 determines whether or not the table name of the CRUD diagram file is a null character (operation S410). When it is determined that the table name is a null character (operation S410: YES), the CRUD diagram generating unit 320 enters the table name of the argument in the CRUD diagram file (operation S411). When it is determined that the table name is not a null character (operation S410: NO), the CRUD diagram generating unit 320 skips operation S411. For example, the already entered screen name is the subsequent process target.

When the process of operation S410 or operation S411 is completed, the CRUD diagram generating unit 320 enters the CRUD (operation S412). For example, any one of C, R, U, and D is entered in an entry column designated by the screen name and the table name specified by operations S408 to S411. For example, in a case where C is entered at the position of the first character in the entry column and D is already entered at the position of the fourth character, the CRUD diagram generating unit 320 acquires these description contents. Then, when the command type "1" is an argument, the CRUD diagram generating unit 320 rewrites R at the position of the second character from a blank state. When operation S412 is completed, the CRUD diagram file is closed (operation S413), and the process is terminated.

As illustrated in FIGS. 9 and 10, screen names which do not overlap with each other and table names which do not overlap with each other are sequentially entered in the CRUD diagram file in which nothing is entered at the beginning. In a case, where there is a command to be entered in the entry column specified by the screen name and the table name, C, R, U, and D are entered in the entry column in order according to the command type. Therefore, the CRUD diagram is completed and accumulated in the CRUD diagram DB 330.

For example, the second server 300 includes a CRUD diagram generating unit 320. The CRUD diagram generating unit 320 specifies an SQL in association with the screen name of the display screen based the log stored in the monitoring DB 310 by executing a second intermediate code obtained by embedding, into the first intermediate code generated by compiling an application including the screen display command, the command for storing the log related to the process in the monitoring DB 310. The CRUD diagram generating unit 320 analyzes the specified SQL to specify the table name, and outputs a CRUD diagram including specified C, R, U, or D for each specified table name in association with the screen name. The case of the screen ID, the button name, or the button ID is basically similar to the case of the screen name. Therefore, the CRUD diagram indicating the type of data operation performed on the table may be output for each screen or for each button.

For example, when the source file is searched to specify the line issuing the SQL, the CRUD diagram may not be generated for each screen or button even though the CRUD diagram is generated by using the SQL and the source file name of the SQL issuer. For example, even when an application issues an SQL, the same is applied to a case where internal structure levels such as classes and methods of the issued SQL and the issuer are used. For example, since logs for specifying screens and buttons that specify screens stored in the monitoring DB 310 are used, a CRUD diagram may be output on a screen-by-screen or button-by-button basis.

For example, as described above, an application may be used as an example of a source program. Alternatively, middleware may be used instead of the application.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium recording an analysis program for causing a computer to execute a process comprising:
    embedding a command for generating a process log that monitors a behavior of a source program in a storage into a compiled program generated by compiling the source program, the source program including a display command instructing to display one or more objects, each being a screen or a button, such that a program in which the command is embedded is generated;
    executing the program to generate the process log that serves as monitoring data;
    storing the process log that serves as the monitoring data in a monitoring database;
    reading out the process log from the monitoring database;
    determining whether SQL (Structured Query Language) data is present in the monitoring data;
    when it is determined that the SQL data is present in the monitoring data, analyzing a syntax of the SQL data such that a data operation command and identification information of the one or more objects are specified based on the process log, the identification information of the one or more objects including one or more of screen names and button names each serving as an access source;
    analyzing the data operation command to specify one or more access destinations that includes table names and accessed by the one or more objects, respectively;
    determining a type of the data operation command specified in the analyzing the syntax of the SQL data;
    associating the identification information of the one or more objects to the one or more access destinations including the table names such that a correspondence table is generated in which information indicating the type of the data operation command is represented in each of the one or more access destinations; and
    outputting, for each of the one or more objects each being the screen or the button, the correspondence table generated at the associating.

2. The non-transitory computer-readable recording medium according to claim 1, wherein the data operation command is specified based on a log that specifies the one or more objects at the analyzing the syntax of the SQL data.

3. The non-transitory computer-readable recording medium according to claim 1, wherein the information indicating the type of the data operation command is one of a character for specifying creation, a character for specifying reference, a character for specifying update, and a character for specifying deletion, or a combination of at least two of the character for specifying creation, the character for specifying the reference, the character specifying the update, and the character specifying the deletion.

4. An analysis method comprising:
    embedding a command for generating a process log that monitors a behavior of a source program into a compiled program generated by compiling the source program, the source program including a display command instructing to display one or more objects, each being a screen or a button, such that a program in which the command is embedded is generated;
    executing the program to generate the process log that serves as monitoring data;
    storing the process log that serves as the monitoring data in a monitoring database;
    reading out the process log from the monitoring database;
    determine whether SQL (Structured Query Language) data is present in the monitoring data;
    when it is determined that the SQL data is present in the monitoring data, analyzing a syntax of the SQL data such that a data operation command and identification information of the one or more objects are specified based on the process log, the identification information of the one or more objects including one or more of screen names and button names each serving as an access source;
    analyzing the data operation command to specify one or more access destinations that includes table names and accessed by the one or more objects, respectively;
    determining a type of the data operation command specified in the analyzing the syntax of the SQL data;
    associating the identification information of the one or more objects to the one or more access destinations including the table names such that a correspondence table is generated in which information indicating the type of the data operation command is represented in each of the one or more access destinations; and
    outputting, for each of the one or more objects each being the screen or the button, the correspondence table generated at the associating.

5. The analysis method according to claim 4, wherein the data operation command is specified based on a log that specifies the one or more objects at the analyzing the syntax of the SQL data.

6. The analysis method according to claim 4, wherein the information indicating the type of the data operation command is one of a character for specifying creation, a character for specifying reference, a character for specifying update, and a character for specifying deletion, or a combination of at least two of the character for specifying creation, the character for specifying the reference, the character specifying the update, and the character specifying the deletion.

7. An analysis apparatus comprising:
a memory that stores an analysis program; and
a processor coupled to the memory and the processor configured to perform a process based on the analysis program, wherein the process includes:
embedding a command for generating a process log that monitors a behavior of a source program into a compiled program generated by compiling the source program, the source program including a display command instructing to display one or more objects, each being a screen or a button, such that a program in which the command is embedded is generated;
executing the program to generate the process log that serves as monitoring data;
storing the process log that serves as the monitoring data in a monitoring database;
reading out the process log from the monitoring database;
determine whether SQL (Structured Query Language) data is present in the monitoring data;
when it is determined that the SQL data is present in the monitoring data, analyzing a syntax of the SQL data such that a data operation command and identification information of the one or more objects are specified based on the process log, the identification information of the one or more objects including one or more of screen names and button names each serving as an access source;
analyzing the data operation command to specify one or more access destinations that includes table names and accessed by the one or more objects, respectively;
determining a type of the data operation command specified in the analyzing the syntax of the SQL data;
associating the identification information of the one or more objects to the one or more access destinations including the table names such that a correspondence table is generated in which information indicating the type of the data operation command is represented in each of the one or more access destinations; and
outputting, for each of the one or more objects each being the screen or the button, the correspondence table generated at the associating.

8. The analysis apparatus according to claim 7, wherein the data operation command is specified based on a log that specifies the one or more objects.

9. The analysis apparatus according to claim 7, wherein the information indicating the type of the data operation command is one of a character for specifying creation, a character for specifying reference, a character for specifying update, and a character for specifying deletion, or a combination of at least two of the character for specifying creation, the character for specifying the reference, the character specifying the update, and the character specifying the deletion.

* * * * *